Nov. 27, 1945.  B. E. HOUSE  2,389,978

HYDRAULIC BRAKING SYSTEM

Filed June 23, 1944

INVENTOR
BRYAN E. HOUSE
BY
T. J. Plante
ATTORNEY

Patented Nov. 27, 1945

2,389,978

UNITED STATES PATENT OFFICE 2,389,978

HYDRAULIC BRAKING SYSTEM

Bryan E. House, South Bend, Ind., assignor to Bendix Aviation Corporation, South Bend, Ind., a corporation of Delaware Application June 23, 1944, Serial No. 541,677

2 Claims. (Cl. 188—152)

This invention relates to hydraulic braking systems, wherein each of the brakes is provided with two wheel cylinders.

An object of the invention is to simplify the maintenance and servicing of such hydraulic systems by reducing the total number of bleed points.

Figure 1:
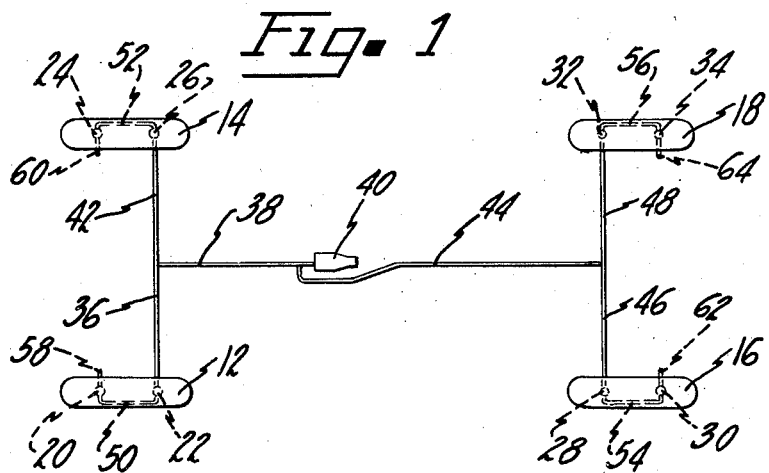
Figure 2:
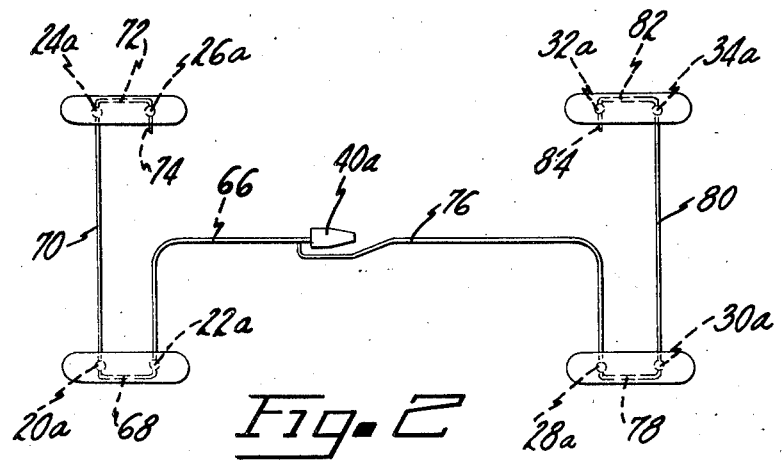

Other objects of the present invention will become apparent during the course of the following description, reference being had therein to the accompanying drawing, in which:

Figure 1 is a diagrammatic view of a hydraulic system bled according to one embodiment of my invention; and Figure 2 is a diagrammatic view of a hydraulic brake system bled according to a second embodiment of my invention.

In the hydraulic braking systems currently in use where two wheel cylinders are used in each brake, it is customary to provide a bleed port in each wheel cylinder of each brake. Each wheel cylinder also is connected by means of a branch conduit to a cross conduit which interconnects a pair of brakes (either the front brakes or the rear brakes) and each cross conduit, one being provided at the front and another at the rear, is connected to the master cylinder.

As all four brakes have two wheel cylinders, there are eight bleed points in the system, making the bleeding of the system a complicated and time consuming procedure.

In the embodiment of Figure 1, I have reduced the total number of bleed points to four, and in the embodiment of Figure 2, I have reduced the total number of bleed points to two, as compared to eight in the conventional system.

Referring to Figure 1, there is shown diagrammatically a four-wheel vehicle braking system, the wheels being numbered 12, 14, 16 and 18. Each of these wheels has a brake associated therewith, and each brake is applied by two wheel cylinders. There are eight wheel cylinders in the entire four-wheel braking system, numbered 20, 22, 24, 26, 28, 30, 32 and 34. Cylinder 22 is connected by means of conduit 36 with conduit 38 which leads to the master cylinder or fluid pressure source 40. Cylinder 26 is connected with conduit 38 by means of conduit 42. A second master cylinder conduit 44 is connected to cylinder 28 by means of conduit 46 and to cylinder 32 by means of conduit 48. Within each brake the cylinders are interconnected, cylinders 20 and 22 being interconnected by conduit 50, cylinders 24 and 26 being interconnected by conduit 52, cylinders 28 and 30 being interconnected by conduit 54, and cylinders 32 and 34 being interconnected by conduit 56.

There are four bleed ports in the entire system, cylinder 20 having bleed port 58, cylinder 24 having bleed port 60, cylinder 30 having bleed port 62, and cylinder 34 having bleed port 64. When it is desired to bleed the brakes the four bleed ports 58, 60, 62 and 64 are opened and fluid is forced into the system through the master cylinder 40. Fluid flows through conduit 38, thence into conduits 36 and 42, thence through cylinders 22 and 26 respectively, through conduits 50 and 52 respectively, through cylinders 20 and 24 respectively, and out the respective bleed ports 58 and 60. The same occurs at the opposite end of the vehicle, where fluid is forced through conduit 44 into conduits 46 and 48, thence through cylinders 28 and 32 respectively, through conduits 54 and 56 respectively, through cylinders 30 and 34 respectively, and out the respective bleed ports 62 and 64.

In the embodiment of Figure 2, a conduit 66 connects master cylinder 40a to wheel cylinder 22a. A conduit 68 interconnects wheel cylinders 22a and 20a. Wheel cylinder 20a is connected to wheel cylinder 24a of the opposite brake by means of conduit 70, while conduit 72 interconnects wheel cylinders 24a and 26a. Wheel cylinder 26a is provided with a bleed port 74.

The opposite end of the system may be identical with that just described. A conduit 76 connects master cylinder 40a to wheel cylinder 28a, wheel cylinders 28a and 30a being interconnected by means of conduit 78. A conduit 80 connects wheel cylinder 30a to wheel cylinder 34a of the opposite brake, wheel cylinders 34a and 32a being interconnected by means of conduit 82. Wheel cylinder 32a is provided with a bleed port 84.

It is thus apparent that the only bleed points in the system are provided by bleed ports 74 and 84. In order to bleed the system, fluid is forced from master cylinder 40a, through conduits 66 and 76, thence through wheel cylinders 22a and 28a respectively, through conduits 68 and 78 respectively, through wheel cylinders 20a and 30a respectively, thence through conduits 70 and 80 respectively, through wheel cylinders 24a and 34a respectively, thence through conduits 72 and 82 respectively, into wheel cylinders 26a and 32a respectively, and out the respective bleed ports 74 and 84.

By reducing the number of bleed points to two, I have facilitated the bleeding of the hydraulic system to an even greater extent than shown in Figure 1.

Although particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a hydraulic braking system having at least two brakes and having two wheel cylinders in each brake, a conduit connecting the first cylinder of the first brake to a fluid pressure source, a conduit interconnecting the first and second cylinders of the first brake, a conduit connecting the second cylinder of the first brake to the first cylinder of the second brake, a conduit interconnecting the first and second cylinders of the second brake, and a bleed port in the second cylinder of the second brake, the entire four wheel cylinders of the two brakes being bled through said bleed port.

2. In a hydraulic braking system having a master cylinder, four wheel brakes, and two wheel cylinders in each brake, a first conduit connecting the first cylinder of the first brake to the master cylinder, a second conduit interconnecting the first and second cylinders of the first brake, a third conduit connecting the second cylinder of the first brake to the first cylinder of the second brake, a fourth conduit interconnecting the first and second cylinders of the second brake, a bleed port in the second cylinder of the second brake, a fifth conduit connecting the first cylinder of the third brake to the master cylinder, a sixth conduit interconnecting the first and second cylinders of the third brake, a seventh conduit connecting the second cylinder of the third brake to the first cylinder of the fourth brake, an eighth conduit interconnecting the first and second cylinders of the fourth brake, and a second bleed port in the second cylinder of the fourth brake, the entire eight wheel cylinders being bled through the two bleed ports.

BRYAN E. HOUSE.